United States Patent [19]

Ahn

[11] Patent Number: 5,499,777
[45] Date of Patent: Mar. 19, 1996

[54] REEL DISC DRIVING DEVICE FOR A VIDEO CASSETTE RECORDER

[75] Inventor: Seong-Ick Ahn, Seoul, Rep. of Korea

[73] Assignee: Daewoo Electronics Co., Ltd., Seoul, Rep. of Korea

[21] Appl. No.: 304,059

[22] Filed: Sep. 12, 1994

[30] Foreign Application Priority Data

Sep. 15, 1993 [KR] Rep. of Korea .................. 1993-18537

[51] Int. Cl.⁶ .............................. G03B 1/04; G03B 19/04; G11B 15/32
[52] U.S. Cl. ...................... 242/356; 242/356.5; 360/96.3; 74/354; 74/810.1
[58] Field of Search .................................. 242/356, 356.5; 360/96.3; 74/354, 810.1

[56] References Cited

U.S. PATENT DOCUMENTS 2,896,873  7/1959  Mageoch ..................................... 74/354
4,681,281  7/1987  Aarts et al. ......................... 360/96.3 X

*Primary Examiner*—John Q. Nguyen
*Attorney, Agent, or Firm*—Anderson Kill Olick & Oshinsky

[57] ABSTRACT

A video cassette recorder is provided with a device for driving selectively one of a supply reel disc and a take-up reel disc rotatably mounted to a deck thereof, which includes a pulley coupled to a shaft of the deck, a driving gear coupled to the shaft of the deck, a clutch assembly jointed the pulley and the driving gear, an idle gear meshed with the driving gear and disposed between the supply reel disc and the take-up reel disc for a selective engagement with the one of the reel discs by a rotating torque of the pulley, a support plate pivoted at the shaft of the deck for supporting the idle gear, and a plurality of resilient pieces integral with the idle gear and in contact with the support plate. The support plate is provided with a screw secured thereto for adjusting the frictional force generated between the idle gear and the support plate. The support plate includes a cylindrical rib formed at a lower portion thereof. The idle gear includes a boss formed at a central portion thereof and adapted to rotatably couple with the rib of the support plate. The adjusting screw includes an annular flange suitable for bearing the boss of the idle gear.

6 Claims, 3 Drawing Sheets

REEL DISC DRIVING DEVICE FOR A VIDEO CASSETTE RECORDER

FIELD OF THE INVENTION

The present invention relates to a reel disc driving mechanism; and, more particularly, to a device for driving reel discs of a video cassette recorder ("VCR"), capable of providing a smooth rotation of an idler which is in a selective engagement with one of the reel discs during the operation of the VCR in a selected mode.

DESCRIPTION OF THE PRIOR ART

As is well known, a VCR is operable in various modes, e.g., play mode, review mode, rewinding mode, fast forward mode, etc., through the selective operation of the driving mechanism thereof. Usually, the switching of the operating mode is executed by the selective drive of a supply reel disc and a take-up reel disc of the VCR. In general, such a driving mechanism includes an idler disposed between the supply reel disc and the take-up reel disc, which is shifted clockwise and counterclockwise to transmit selectively its driving force to one of the reel discs, thereby enabling the VCR to operate in a certain selected mode; and a support plate for rotatably supporting the idler coupled to a shaft thereof. Further, a felt member is provided between the idler and the support plate so as to reduce the frictional resistance against the rotation of the idler.

A typical reel disc driving system of a VCR is schematically shown in FIG. 1. The VCR shown therein includes a supply reel disc 2 and a take-up reel disc 4 rotatably mounted to a deck(not shown). A magnetic tape T drawn out of a supply reel 6 of a video cassette loaded in the VCR travels along a given path provided on the deck, i.e., along the path defined by an eraser head 8, a guide post 10, a head drum 12, an audio head 14 and a pinch roller 16, etc., and then is wound around a take-up reel 18 of the cassette.

As shown in FIG. 1, the VCR is provided with a reel disc driving mechanism 20 disposed between the supply reel disc 2 and the take-up reel disc 4, which drives selectively one of the reel discs 2, 4 during the operation of the VCR in a selected mode. Typically, the reel disc driving mechanism 20 includes a driving pulley 22 secured to a shaft 24 of a capstan motor 23, a driven pulley 26 rotatably coupled to a fixed shaft 30 and interlinked to the driving pulley 22 via a belt 28, a driving gear 32 rotatably mounted to the shaft 30, and an idle gear 34 carried by a support plate 36 and meshed with the driving gear 32. In case of changing the operating mode, with a forward or reverse drive of the capstan motor 23, the driving gear 32 is rotated clockwise or counterclockwise through the driving pulley 22 and the driven pulley 26, thereby causing the idle gear 34 to shift toward and engage with either the take-up reel disc 4 or the supply reel disc 2 by the rotating torque of the driven pulley 26 so that the VCR operates in the desired operating mode.

FIG. 2 shows a conventional structure of the idle gear 34 commonly employed in the reel disc mechanism of FIG. 1. As depicted in FIG. 2, the support plate 36 is rotatably pivoted at the fixed shaft 30 and includes a shaft 38 secured thereto. The idle gear 34 is rotatably coupled to the shaft 38 of the support plate 36 and biased upward by a spring 40 seated around the shaft 38 so as to properly mesh with the driving gear 32. Further, interposed between the idle gear 34 and the support plate 36 is a ring-shaped felt member 42 which serves to prevent a direct contact of the idle gear 34 with the support plate 36, thereby reducing the frictional resistance against the rotation of the idle gear 34. In addition, the idle gear 34 includes an annular projection 44 formed on an upper surface thereof, which holds the felt member 42 in place on the idle gear 34.

Although the associated idle gear and support plate described above may be useful for their intended purpose, they are still inadequate to alleviate the friction between the idle gear and the support plate especially because the overall top and bottom surfaces of the felt member are in contact with the support plate and the idle gear. As a result, there may exist interferences against the smooth rotation of the idle gear, and the power consumption of the capstan motor may also increase. Further, the existence of the felt member and the spring at the idle gear makes the assembling process of the reel disc driving mechanism more complicated. Additionally, the prior art driving device has a disadvantage in that it is difficult to adjust the frictional force between the idle gear and the support plate via the spring.

SUMMARY OF THE INVENTION

Accordingly, it is an object of the present invention to provide a reel disc driving device for use in a VCR, which is capable of minimizing the contacting area between an idle gear and a support plate of the driving device to thereby smoothly rotate the idle gear during the operation of the VCR in a selected mode.

It is another object of the present invention to provide a reel disc driving device which is designed to adjust the frictional force between an idle gear and a support plate of the device and to simplify the structure thereof.

The above and other objects of the present invention are accomplished by providing an improved reel disc driving device for use in a VCR having a supply reel disc and a take-up reel disc rotatably mounted to a deck of the VCR, which includes a pulley coupled to a shaft mounted to the deck, a driving gear coupled to the shaft of the deck, a clutch assembly jointed the pulley and the driving gear, an idle gear meshed with the driving gear and disposed between the supply reel disc and the take-up reel disc for a selective engagement with one of the reel discs, a support plate pivoted at the shaft of the deck for supporting the idle gear, and means for driving the pulley to transmit its driving force to said one of the reel discs through the idle gear, the improvement comprising:

a plurality of resilient pieces integral with the top surface of the idle gear and in contact with the bottom surface of the support plate; and means secured to the support plate for adjusting the frictional force occurring between the idle gear and the support plate.

In accordance with a preferred embodiment of the present invention, the respective resilient pieces are arranged in a properly spaced relationship with each other so as to maintain a horizontal rotating balance of the idle gear with respect to the support plate. Each of the resilient pieces includes a rounded projecting portion which is in a point contact with the support plate, providing a further reduction of the contacting area therebetween. The support plate includes a cylindrical rib which has a threaded hole formed therein. Further, formed at a central portion of the idle gear is a boss which is apt to rotatably couple with the rib of the support plate. The adjusting means includes a screw engaged with the threaded hole of the rib of the support plate, which has an annular flange suitable for supporting the bottom surface of the boss of the idle gear.

BRIEF DESCRIPTION OF THE DRAWINGS

The above and other objects, features and advantages of the present invention will become apparent from the following detailed description given in conjunction with the accompanying drawings, in which.

DETAILED DESCRIPTION OF THE PREFERRED EMBODIMENTS

Figure 1:
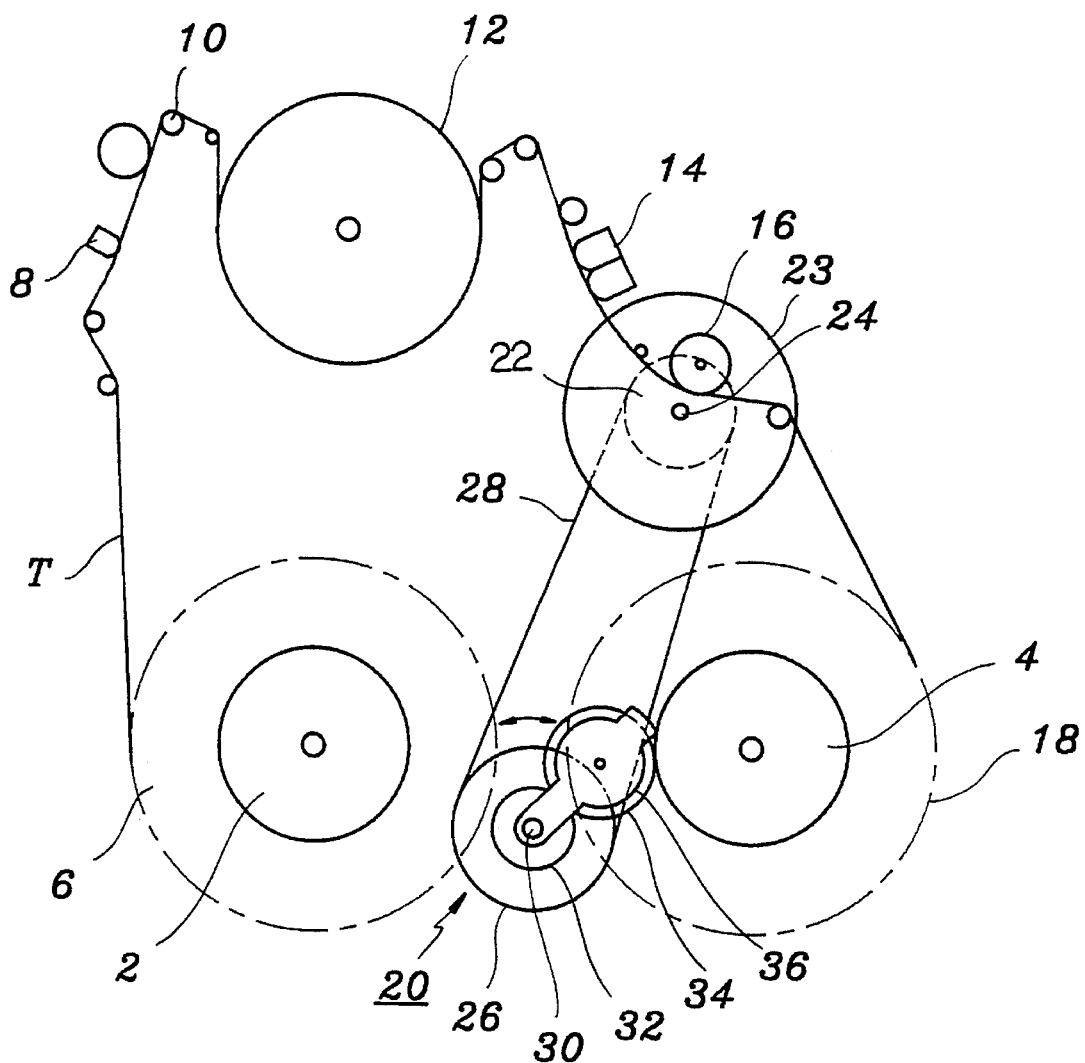
FIG. 1 is a schematic plan view of a typical reel disc driving system of a VCR.
Figure 2:
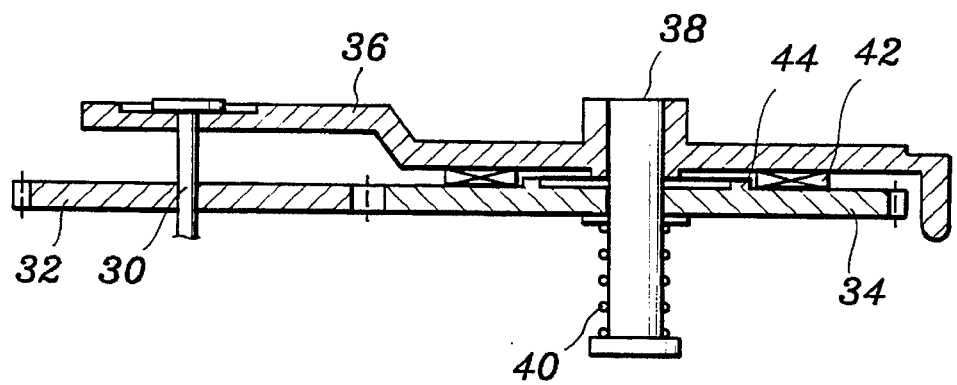
FIG. 2 is a partial sectional view of a prior art reel disc driving mechanism commonly used in the VCR of FIG. 1.
Figure 3:
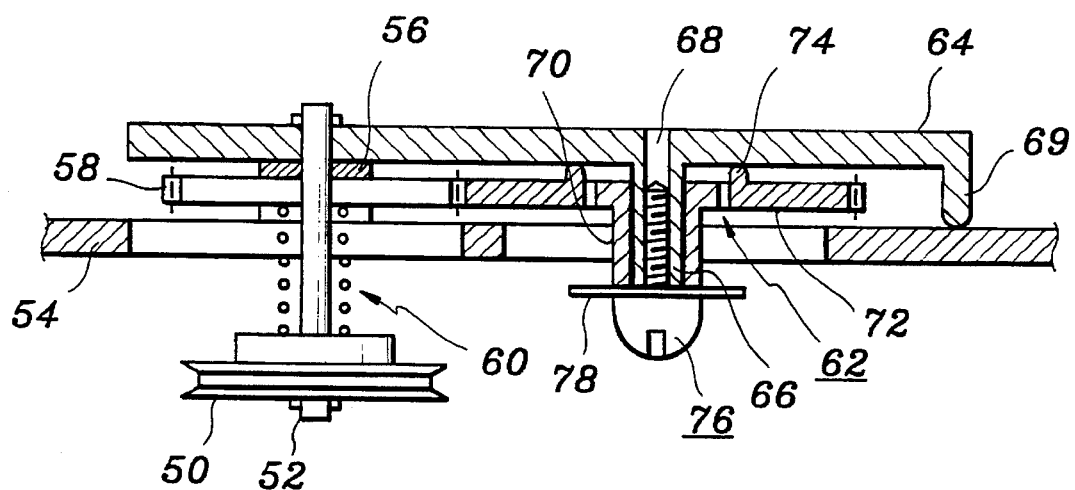
FIG. 3 is a sectional view of a reel disc driving mechanism employed in the VCR of FIG. 1 in accordance with a preferred embodiment of the present invention, with its parts removed for clarity.

Referring now to FIG. 3, there is shown a reel disc driving device for use in a VCR in accordance with a preferred embodiment of the present invention. The reel disc driving device of the invention is similarly employed in the typical VCR of FIG. 1. Accordingly, the construction of the driving system of the VCR depicted in FIG. 1 will not be further discussed herein for the purpose of avoiding redundant descriptions thereof. Rather, the following discussions are primarily directed to an idling structure of the reel disc driving device of the present invention with reference to FIGS. 3 to 5.

As illustrated in FIG. 3, a pulley 50 is rotatably mounted to a shaft 52 which is fixed to a deck 54 of the VCR through a bracket 56. The pulley 50 is driven by the driving pulley 22 secured to the shaft 24 of the capstan motor 23 via the belt 28 (see FIG. 1). In addition, a driving gear 58 is rotatably coupled to the shaft 52 of the deck 54. Interposed between the pulley 50 and the driving gear 58 is a clutch assembly 60 which serves to transmit the driving force of the pulley 50 to the gear 58. An idle gear 62 is in mesh with the driving gear 58; and selectively shifted to and engaged with one of the reel discs 2, 4 by the rotating torque of the pulley 50 during the change of the operating mode. Swingably pivoted at an upper portion of the shaft 52 of the deck 54 is a support plate 64 which is designed to hold the idle gear 62 so as to mesh it with the driving gear 58 with accuracy.

Figure 4:
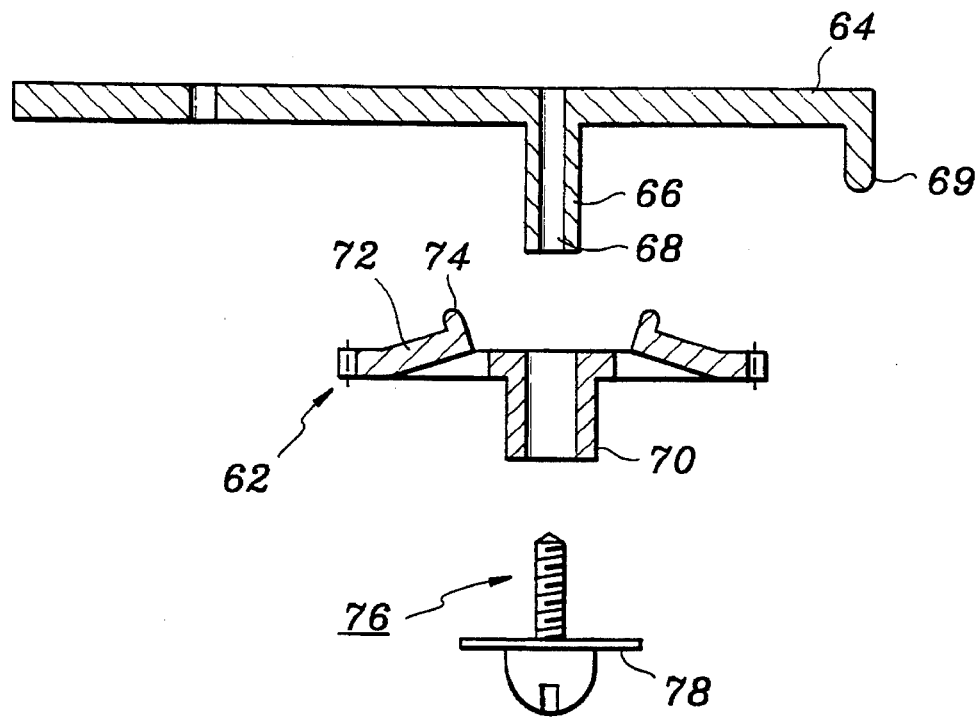
FIG. 4 is an exploded view of the reel disc driving mechanism shown in FIG. 3, with its pulley and driving gear. broken away for brevity.

As best represented in FIG. 4, the support plate 64 includes a cylindrical rib 66 integrally formed with a lower portion thereof, in which a threaded hole 68 is provided, and a bent portion 69 formed at its end, which is slidably supported on the deck 54 (see FIG. 3). The idle gear 62 includes a boss 70 formed at a central portion thereof, which is adapted to rotatably couple with the cylindrical rib 66 of the support plate 64. Further, provided at the idle gear 62 are a plurality of resilient pieces 72 which are in contact with the bottom surface of the support plate 64. This results in a substantial reduction of the contacting area between the idle gear 62 and the support plate 64, minimizing the frictional resistance against the rotation of the idle gear 62. Therefore, during the operation of the VCR, the idle gear 62 will rotate smoothly, thereby reducing the power consumption of the capstan motor. Preferably, the resilient pieces 72 are constructed on the idle gear 62 by using a lancing technique or may be molded integrally with the idle gear 62 in order to impart an appropriate elasticity to them. Each of the resilient pieces 72 has a rounded projecting portion 74 formed at its tip, which is in a point contact with the support plate 64, providing a further smooth rotation of the idle gear 62.

Figure 5:
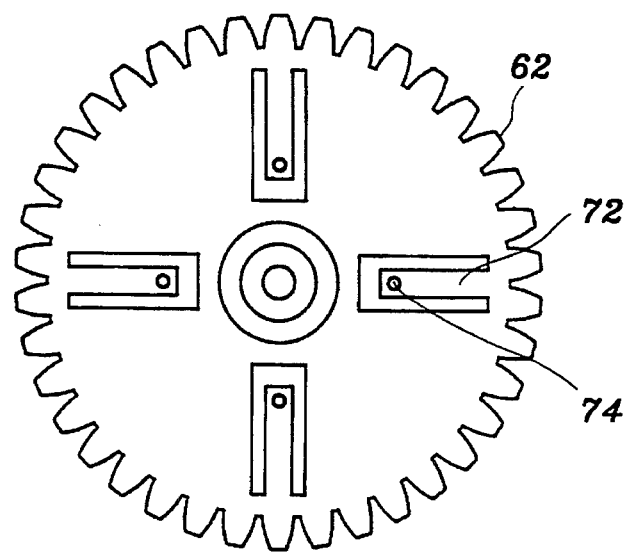
FIG. 5 is a plan view of an idle gear of the reel disc driving mechanism represented in FIG. 4.

As shown in FIG. 5, the respective resilient pieces 72 of the idle gear 62 are arranged in a properly spaced relationship with each other so as to maintain a horizontal rotating balance of the idle gear 62 with respect to the support plate 64.

Referring back to FIGS. 3 and 4, the support plate 64 is provided with a screw 76 for adjusting the frictional force generated between the idle gear 62 and the support plate 64. The adjusting screw 76 is engaged with the threaded hole 68 of the support plate 64 and includes an annular flange 78 suitable for bearing the boss 70 of the idle gear 62 on the cylindrical rib 66 of the support plate 64. Therefore, the tightening or loosening of the adjusting screw 76 will cause the idle gear 62 to move upward or downward along the cylindrical rib 66 of the support plate 64, thereby providing a fine adjustment of the frictional force between the idle gear 62 and the support plate 64 due to the transformation of the resilient pieces 74 of the idle gear 62. Further, this makes it easier to align the idle gear 62 with the driving gear 58 during the assembling process of the device.

Although the invention has been shown and described with respect to the preferred embodiments, it will be understood by those skilled in the art that certain changes and modifications may be made without departing from the spirit and scope of the invention as defined in the following claims.

What is claimed is:

1. A reel disc driving device; for use in a video cassette recorder having a supply reel disc and a take-up reel disc rotatably mounted to a deck of the recorder, said reel disc driving device including a pulley rotatably coupled to a shaft mounted to the deck, a driving gear rotatably coupled to the shaft of the deck, a clutch assembly interconnected between said pulley and said driving gear for transmitting the driving force of the pulley to the driving gear, an idle gear having a rotational axis and meshed with said driving gear and disposed between the supply reel disc and the take-up reel disc for a selective engagement with one of the reel discs, a support plate pivoted at the shaft of the deck for rotatably supporting said idle gear and positioned axially opposed to said idle gear, with a bottom surface of the support plate facing a top surface of the idle gear, and means for driving said pulley to transmit the driving force from the means for driving to said one of the reel discs through said idle gear, the improvement comprising:

a plurality of separate resilient members upwardly projected from the top surface of said idle gear and each formed of a cantilever configuration, each of said resilient members having a fixed end integrally formed with said idle gear and a free end apart from the top surface of said idle gear and in contact with the bottom surface of said support plate each resilient member resiliently bending between said ends due to said cantilever configuration; and means secured to said support plate for adjusting the frictional force occurring between the support plate and the free ends of the resilient members through the resilient transformation of the resilient members.

2. The reel disc driving device of claim 1, wherein said respective resilient members are arranged at a given interval from each other along the circumference of said idle gear.

3. The reel disc driving device of claim 2, wherein each of said resilient members includes a rounded projecting portion formed at the free end in a point contact with the bottom surface of said support plate.

4. The reel disc driving device of claim 3, wherein said respective resilient members are integrally formed on said idle gear by molding.

5. The reel disc driving device of claim 2, wherein said support plate includes a cylindrical rib downwardly extending from the bottom surface of the support plate, said cylindrical rib having a threaded hole formed therein; and said idle gear includes a boss formed at a central portion thereof and adapted to rotatably couple with the rib of said support plate.

6. The reel disc driving device of claim 5, wherein said adjusting means includes a screw engaged with the threaded hole of said cylindrical rib, and an annular flange provided at the screw for supporting the boss of said idle gear and urging the idle gear against the support plate to resiliently transform the resilient members.

* * * * *